United States Patent [19]

Iizuka et al.

[11] Patent Number: 4,795,238

[45] Date of Patent: Jan. 3, 1989

[54] LIQUID CRYSTAL FOCUSING SCREEN HAVING DIFFERENT GROUPS OF ELECTRODES

[75] Inventors: Kiyoshi Iizuka; Takashi Suzuki, both of Kanagawa, Japan

[73] Assignee: Canon Kabushiki Kaisha, Tokyo, Japan

[21] Appl. No.: 80,237

[22] Filed: Jul. 27, 1987

Related U.S. Application Data

[63] Continuation of Ser. No. 898,754, Aug. 13, 1986, abandoned, which is a continuation of Ser. No. 617,795, Jun. 6, 1984, abandoned.

[30] Foreign Application Priority Data

Jun. 13, 1983 [JP] Japan ................................. 58-105589

[51] Int. Cl.⁴ .......................... G02F 1/133; G09G 3/00
[52] U.S. Cl. ..................................... 350/332; 350/336; 340/793
[58] Field of Search ................... 350/347 V, 334, 346, 350/348, 336, 332; 358/283; 340/793

[56] References Cited

U.S. PATENT DOCUMENTS

| | | | |
|---|---|---|---|
| 3,915,548 | 10/1975 | Opittek et al. | 350/334 |
| 3,916,096 | 10/1975 | Everett et al. | 358/283 |
| 3,956,169 | 5/1976 | Nakano et al. | 350/350 R |
| 3,995,942 | 12/1976 | Kawakami et al. | 350/333 |
| 4,054,362 | 10/1977 | Baues | 350/347 V |
| 4,180,813 | 12/1979 | Yoneda et al. | 350/333 X |
| 4,208,115 | 6/1980 | Proske | 350/336 X |
| 4,389,095 | 6/1983 | Teshima et al. | 350/334 |
| 4,516,835 | 5/1985 | Suzuki et al. | 350/336 |

FOREIGN PATENT DOCUMENTS

| | | | |
|---|---|---|---|
| 1136843 | 12/1982 | Canada | 350/350 R |
| 2254057 | 8/1975 | France | 350/347 V |
| 0141722 | 5/1980 | German Democratic Rep. | 350/336 |
| 0115523 | 10/1975 | Japan | 350/347 V |

OTHER PUBLICATIONS

Kowel et al., I "A Liquid Crystal Adaptive Lens" in Proceedings, NASA Conference on Optical Information Proceeding for Aerospace Applications, VA, (1981).

Kowel et al., II "Focusing by Electrical Modulation in a Liquid Crystal Cell" Applied Optics Jan. 15, 1984.

Soref "Field Effects in Nematic Liquid Crystals Obtained with Interdigital Electrodes" Journal of Applied Physics, vol. 45, No. 12, Dec. 1974.

Stucki "Optimal Digital Halftone Pattern Generation Method" IBM Tech. Disc., vol. 17, No. 9, Feb. 1975, pp. 2779-2780.

*Primary Examiner*—Stanley D. Miller
*Assistant Examiner*—David Lewis
*Attorney, Agent, or Firm*—Toren, McGeady & Associates

[57] ABSTRACT

A focusing screen for observing an image formed by an objective lens is constructed of a liquid crystal layer, having a dynamic scattering effect, sandwiched between a pair of parallel transparent electrodes. At least one of the transparent electrodes is divided into a plurality of discrete parts. The discrete electrode parts are connected as independent groups through a switch mechanism to a driving circuit. The switch mechanism permits one or more of the groups to act as different elements in response to an applied voltage, depending on the F value of the lens. Accordingly, the scattering degree of the focusing screen varies as a function of the F value and not the applied voltage.

4 Claims, 2 Drawing Sheets

LIQUID CRYSTAL FOCUSING SCREEN HAVING DIFFERENT GROUPS OF ELECTRODES

This is a continuation of application Ser. No. 898,754, filed Aug. 13, 1986, now abandoned, which in turn is a continuation application of Ser. No. 617,795, filed June 6, 1984, now abandoned.

BACKGROUND OF THE INVENTION

1. Field of the Invention

This invention relates to focusing screens for observing an image formed by an objective lens, and more particularly to focusing screens for single lens reflex cameras.

2. Description of the Prior Art

A focusing screen for single lens reflex cameras using a liquid crystal operating in a dynamic scattering mode is shown, for example, in Japanese patent publication No. SHO 48-37379 (Published Nov. 10, 1974). The scattering degree of such a focusing screen can be made arbitrarily adjustable depending on the F value of the photographic lens, as shown, for example, in Japanese laid-open patent application No. SHO 50-115523 (published Sept. 10, 1975).

The focusing screen disclosed in the above-mentioned Japanese laid-open patent application No. SHO 50-115523 operates its entire surface area when a voltage is applied to the liquid crystal layer. The amount of scattering by the focusing screen is adjusted by varying the magnitude of the voltage applied to the liquid crystal layer. Therefore, it is very difficult to maintain the scattering degree of the focusing screen at a desired value. FIG. 1 represents the amount of light transmitted through a prior art liquid crystal having a dynamic scattering effect versus the applied voltage, where the incident light is white and normal to the liquid crystal layer surface and the transmittance of this incident light taken as 100% when no voltage is applied. As is obvious from this graph, a liquid crystal having a dynamic scattering effect has a rapid change in transmission as the applied voltage gradually increases. Therefore, adjusting the scattering degree of a conventional focusing screen to, for example, 70% transmittance has been difficult. Additionally, the voltage which this rapid change in transmittance occurs depends largely on the temperature. Accordingly, maintenance of the applied voltage at a constant level does not always result in a desired diffusion characteristic.

SUMMARY OF THE INVENTION

An object of the present invention is to provide a focusing screen whose diffusion characteristics are easily adjustable in accordance with the F value of a lens.

Other objects of the invention will become apparent from the following description of the embodiments thereof.

DETAILED DESCRIPTION OF THE PREFERRED EMBODIMENTS

Figure 1:
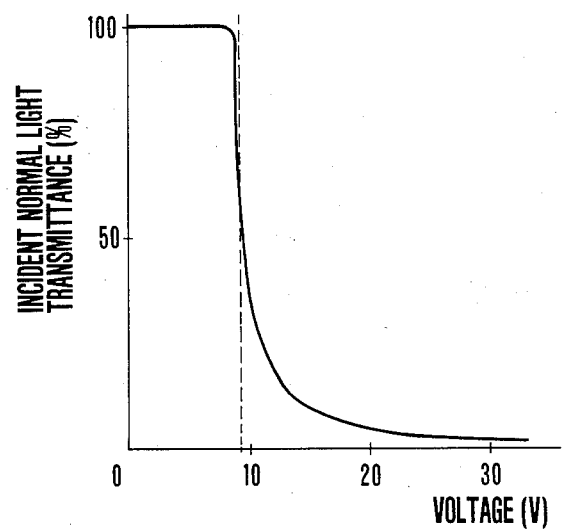
FIG. 1 is a graph illustrating a variation with the applied voltage of the percentage normal light transmittance of a prior art liquid crystal having a dynamic scattering effect.
Figure 2:
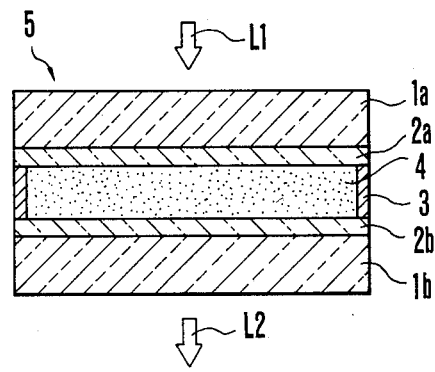
FIG. 2 is a cross-sectional view of an embodiment of the focusing screen according to the present invention.

In FIG. 2, $1a$ and $1b$ are transparent glass substrates. $2a$ and $2b$ are transparent electrodes formed by applying thin films of, for example, indium oxide and tin oxide over the entire areas of the inner surfaces of the glass substrates $1a$ and $1b$, respectively, by vacuum deposition techniques. A liquid crystal layer 4 having a dynamic scattering effect is sealed in the interior of a frame 3 sandwiched between the electrodes $2a$ and $2b$. This liquid crystal cell constitutes a focusing screen 5. This focusing screen 5 is arranged at a position conjugate to a film plane in a camera (not shown). Light L1 from a photographic lens (not shown) enters through the glass substrate $1a$ and transparent electrode $2a$ to liquid crystal layer 4. Light L2 exiting from liquid crystal layer 4 passes through transparent electrode $2b$, glass substrate $1b$ and a pentaprism (not shown), reaching an eye-piece. An image formed by the photographic lens is thus observed. Liquid crystal layer 4 has as large an area as the area of the film frame of the camera.

Figure 3:
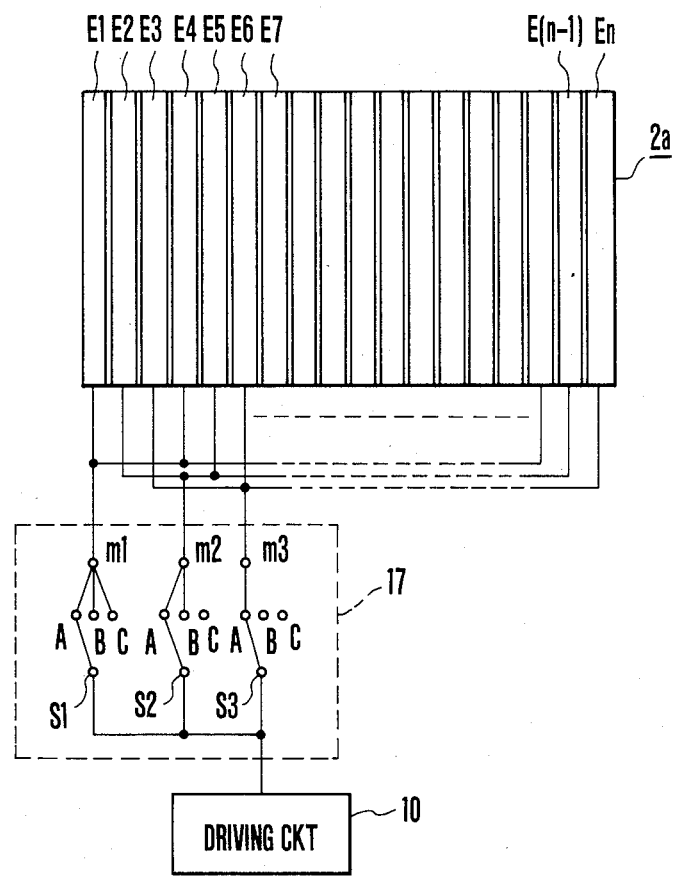
FIG. 3 is a plan view of an example of one of the transparent electrodes of the FIG. 2 embodiment.

Transparent electrode $2a$ is divided into a multiplicity of stripe-shaped parts E1 to En as shown in FIG. 3. The subscripts 1 to n are numbered consecutively from one end of the divided electrode array to the other. The divided stripe-shaped parts E1 to En are, in this embodiment, arranged in three groups. The first group contains the stripe-shaped parts E1, E4, E7, . . . , E(n−2), the second group contains the stripe-shaped parts E2, E5, E8, . . . , E(n−1), and the third group contains the stripe-shaped parts E3, E6, E9, . . . , En. All the stripe-shaped parts in the first group are connected to a contact m1, all the stripe-shaped parts in the second group are connected to a contact m2, and all the stripe-shaped parts in the third group are connected to a contact m3. Switches S1 to S3 have a common terminal connected to a terminal of a driving circuit 10, the other terminal of which being connected to the electrode $2b$. Each switch has three contacts A, B and C. Switching operations of the switches S1, S2 and S3 are simultaneously and synchronously carried out in response to the F value of the photographic lens. Hence, the moving contacts of switches S1, S2 and S3 are mechanically interconnected, as shown by dotted line in FIG. 3. The terminal m1 is connected to all three contacts A, B and C of the switch S1, the terminal m2 is connected to the two contacts A and B of the switch S2, and the terminal m3 is connected to contact A of the switch S3. Therefore, according to this embodiment, when the switches S1 to S3 are changed over to their contacts A, the output of the driving circuit 10 is applied to all the stripe-shaped parts E1 to En. When the switches S1 to S3 are changed over to their contacts B, the output of the driving circuit 10 is connected to the first and second groups of stripe-shaped parts. When the switches S1 to S3 are changed over to their contacts C, the output of the driving circuit 10 is connected to the first group of stripe-shaped parts. Since the transparent electrode $2b$ is also connected to the output of the driving circuit 10, a voltage is applied across the liquid crystal layer 4 between the stripe-shaped parts E1–En of the transparent electrode $2a$ and the transparent electrode $2b$. The plurality of stripe-shaped parts E1–En are operated through selection of three modes by the change-over switches S1–S3. When the change-over switches S1–S3 are in their "A" positions, the voltage from driving circuit 10 is applied to all the stripe-shaped parts E1-En, so that the entire area of the liquid crystal layer 4 becomes a scattering state. When the switches S1-S3 are in their "B" positions, the voltage is applied to the stripe-shaped parts E1, E2, E4, E5, E7, . . . , E(n−1). Those portions of the liquid crystal layer 4 which lie between these parts and the transparent electrode 2b become the scattering state. At this time, no voltage is applied to the stripe-shaped parts E3, E6, E9, . . . , En so that a transparent state in the liquid crystal layer 4 is maintained. That is, one third of the area of the focusing screen 5 is transparent, and two thirds is diffusing. As a whole, focusing screen 5 with change-over switches S1-S3 in their "B" positions becomes lighter than when the change-over switches S1-S3 are in their "A" positions. Moreover, in this case, the scattering parts also are present so that no influence is given to the visual focusing. When the change-over switches S1-S3 are in their "C" positions, the voltage from driving circuit 10 is applied to only the stripe-shaped parts E1, E4, E7, . . . , E(n−2). In other words, one third of the area of the viewfield becomes scattering, and two thirds becomes transparent, giving a still lighter focusing screen 5.

Figure 4:
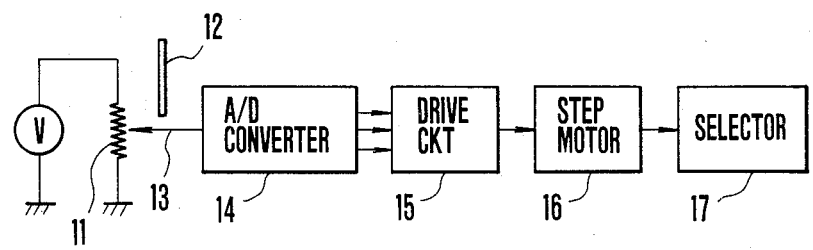
FIG. 4 is a diagram illustrating an example of a control circuit for the FIG. 2 embodiment.

FIG. 4 illustrates a practical example of means for changing over the switches S1-S3 in response to the F value of the lens. Applied across both ends of a variable resistor 11 is a voltage V. Resistor slider 13 is operatively connected through a member 12 to either a signal pin of full open F value for the lens or to an aperture signal lever. This member 12 thus moves in the vertical direction depending on the set F value of the lens. The movement of member 12 adjusts the resistor slider 13 resulting in an electrical signal from variable resistor 11 which varies with the F value, to be applied to an A/D converter 14 having output signals X, Y and Z of "0" or "1" level depending on the input voltage thereto. For example, the signal X takes "1" level when the voltage applied to the converter 14 corresponds to a range of F values is 1.4 to 2.8. The signal Y takes "1" level when the range of F values is 4 to 8. The signal Z takes "1" level when the range of F values is 11 to 22. A drive circuit 15 responds to the signals X, Y and Z and operates a step motor 16 by which the interconnected moving contacts of the switches S1-S3 are driven.

The width of each of the stripe-shaped parts E1-En is, for the purpose of facilitating focusing, desirably of as small a size as possible, namely, narrower than 1 mm, and preferably, less than 0.1 mm. Further, while in the foregoing embodiment, the electrode 2a is divided into a multiplicity of parts, alternatively, the opposite electrode 2b may be selected to be divided, or both of the transparent electrodes 2a and 2b may be divided into stripe-shaped parts with their boundaries crossing each other. Further, it is unnecessary that the number of divided parts in the electrodes 2a and 2b be equal to each other, as the number may be determined to meet the desired aim. Also, the shape of the parts E1-En may, besides being stripe-shaped, be a series of concentric circles, or a series of ellipses having common foci. Further, the widths of the parts E1-En may be different, or progressively wider as the distance from the center increases. The diffusion is made, in this embodiment, variable in three degrees. But it is also possible to use a further increase in the number of degrees as well by increasing the number of groups of parts E1-En.

As has been described in greater detail above, the focusing screen using liquid crystal according to the present invention does not operate through variation of the voltage applied across the liquid crystal layer, but rather through selection of diffusing areas depending on the F value of the lens. Thus there is no need to rely on precisely controlling of the applied voltage, which leads to a steep change of the degree of diffusion of the liquid crystal. Accordingly, visual focusing can always be easily performed without the necessity of forming later adjustment, despite ramping voltage changes as the phase of the liquid crystal cell and temperature change as the adjustment of the brightness of the focusing screen is controlled in accordance with the F value of the photographic lens.

What we claim:

1. A focusing screen for observing an image formed by an objective lens, comprising:

a liquid crystal layer;

first and second transparent electrodes formed on opposite sides of said liquid crystal layer, said first transparent electrode being divided into a plurality of sections each electrically insulated one from the other, said plurality of sections being divided into at least two groups in which the sections in one of said groups are alternately arranged with the sections in the other of said groups and each of the sections is electrically connected in common to the other sections of that group but not to the other groups;

a driving circuit for applying a constant voltage to said liquid crystal layer, said driving circuit having a first and a second output terminal, and said second output terminal being coupled to said second transparent electrode; and means for selectively coupling said first output terminal of said driving circuit to a varying number of said plurality of sections of said first transparent electrode in response to an F value of said objective lens, wherein said coupling means selects which of said groups are activated whereby a varying percentage of said liquid crystal layer corresponding to said varying number of said plurality of sections of said first transparent electrode is subjected to said constant voltage thereby resulting in a corresponding varying diffusion of said liquid crystal layer.

2. A focusing screen according to claim 1, wherein each section has a width less than 1 mm.

3. A focusing screen as in claim 1, wherein each section is in the shape of a stripe extending across the screen.

4. A focusing screen as in claim 2, wherein each section is in the shape of a stripe extending across the screen.

* * * * *